(12) United States Patent
Tiessen

(10) Patent No.: US 11,976,203 B2
(45) Date of Patent: May 7, 2024

(54) ENERGY CURABLE INKS AND COATINGS WITH PEROXIDES

(71) Applicant: SUN CHEMICAL CORPORATION, Parsippany, NJ (US)

(72) Inventor: John G. Tiessen, Northlake, IL (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/913,923

(22) PCT Filed: Mar. 2, 2022

(86) PCT No.: PCT/US2022/018454
§ 371 (c)(1),
(2) Date: Sep. 23, 2022

(87) PCT Pub. No.: WO2022/187316
PCT Pub. Date: Sep. 9, 2022

(65) Prior Publication Data
US 2023/0122750 A1    Apr. 20, 2023

Related U.S. Application Data

(60) Provisional application No. 63/155,886, filed on Mar. 3, 2021.

(51) Int. Cl.
| | | |
|---|---|---|
| *C09D 11/101* | (2014.01) | |
| *B41M 7/00* | (2006.01) | |
| *C09D 11/033* | (2014.01) | |
| *C09D 11/037* | (2014.01) | |
| *C09D 11/107* | (2014.01) | |
| *D21H 19/12* | (2006.01) | |
| *D21H 19/60* | (2006.01) | |
| *D21H 19/82* | (2006.01) | |

(52) U.S. Cl.
CPC ......... *C09D 11/101* (2013.01); *B41M 7/0081* (2013.01); *C09D 11/033* (2013.01); *C09D 11/037* (2013.01); *C09D 11/107* (2013.01); *D21H 19/12* (2013.01); *D21H 19/60* (2013.01); *D21H 19/826* (2013.01)

(58) Field of Classification Search
CPC .......... C09D 11/101; B05D 3/00; B05D 3/02; B05D 3/007; B41M 7/0081; B41M 3/008
See application file for complete search history.

(56) References Cited

U.S. PATENT DOCUMENTS

| | | | | |
|---|---|---|---|---|
| 6,245,827 B1* | 6/2001 | Gregory | ................... | C08L 63/08 526/333 |
| 2005/0025902 A1* | 2/2005 | Kerluke | ................... | B05D 7/14 427/551 |
| 2005/0079293 A1* | 4/2005 | Baumgart | .......... | C08G 18/6254 427/553 |
| 2011/0070372 A1 | 3/2011 | Faucher et al. | | |
| 2014/0315002 A1* | 10/2014 | Gaudl | .................. | C09D 11/107 524/592 |
| 2019/0389236 A1* | 12/2019 | Tiessen | ................... | C09D 11/54 |
| 2020/0369065 A1 | 11/2020 | Tiessen et al. | | |

FOREIGN PATENT DOCUMENTS

| | | | |
|---|---|---|---|
| CN | 101718964 | * | 6/2010 |
| WO | 98/40170 | * | 9/1998 |
| WO | WO 2004/081100 A1 | | 9/2004 |
| WO | WO 2018/165068 | | 9/2018 |
| WO | WO 2019/160833 | | 8/2019 |
| WO | WO 2021/211662 | | 10/2021 |

OTHER PUBLICATIONS

International Search Report issued in International Application No. PCT/US22/18454, dated Jun. 22, 2022.
Written Opinion of the International Searching Authority issued in International Application No. PCT/US22/18454, dated Jun. 22, 2022.
Formulation and Performance Advances in (Meth)Acrylate based Sealants: A UV/Peroxide Dual Cure Feasibility Study; Michael Bailey, William Wolf, RadTech Conference 2014.
Strategies to Reduce Oxygen Inhibition in Photoinduced Polymerization; Samuel Clark Ligon, Branislav Husar, Harald Wutzel, Richard Holman and Robert Liska, Chemical Reviews (2014), 114, p. 557-589.
Acrylated Amine Oligomers to Enhance Cure with UV-LED Sources, James E. Goodrich et al., Painting and Coatings Industry, Jul. 20, 2020.
Solvent-Free Radical Photo-Polymerization with Dark Curing; Kangmin Kim, Jasmine Sinha, Charles B. Musgrave and Jeffrey W. Stansbury; RadTech Conference 2020.
International Preliminary Report on Patentability issued in International Application No. PCT/US22/18454, mailed Sep. 14, 2023.

* cited by examiner

*Primary Examiner* — Tabassom Tadayyon Eslami
(74) *Attorney, Agent, or Firm* — Marian E. Fundytus; Ostrolenk Faber LLP.

(57) ABSTRACT

The present invention provides an improved method for curing multi-layer constructs of energy curable (EC) inks and coatings with actinic radiation. In the method, one or more layers of EC inks and/or coatings comprising materials that can crosslink or polymerize when exposed to actinic radiation, e.g., monomers, oligomers or polymers, are applied to a substrate, which EC inks and coatings contain little or no photoinitiators. This is followed by applying one or more layers of non-EC inks and/or coatings, which comprise one or more organic peroxides but no readily polymerizable components, over the top of the layers of energy curable inks and/or coatings; and exposing the layers to actinic radiation.

19 Claims, No Drawings

ENERGY CURABLE INKS AND COATINGS WITH PEROXIDES

CROSS REFERENCE TO RELATED APPLICATIONS

The present application is a § 371 National Phase application based on PCT/US22/18454 filed Mar. 2, 2022, which claims the benefit of U.S. Provisional Application No. 63/155,886, filed Mar. 3, 2021 the subject matter of each of which is incorporated by reference in their entirety.

FIELD OF THE INVENTION

A method is provided for curing, e.g., UV curing, energy curable (EC) compositions, e.g., EC-compositions comprising acrylates, using a combination of organic peroxide and amine or amino acrylate as initiator. In the method, the peroxide and amine component are typically present in different layers of a multi-layer ink/coating system. The amount of traditional photoinitiators can be greatly reduced or eliminated.

BACKGROUND OF THE INVENTION

UV curing, e.g., polymerization or crosslinking of unsaturated organic materials using photosensitive free radical generators, generically known as "photoinitiators", has been practiced commercially for about 50 years or more. During this time, various classes of well-known organic photoinitiators, including, e.g., α-hydroxyketones, acylphosphine oxides, α-aminoketones, thioxanthones, benzophenones, phenylglyoxylates, oxy-phenyl-acetic acids, oxime esters, acetophenones, etc., benzil; benzil derivatives; titanocene radical initiators, fluorenones, camphorquinones, anthraquinones, etc.

Typically, energy curable (EC) inks, coatings and adhesives contain photoinitiators such as these to enable adequate cure. However, despite their continued commercial use, there is a growing need in many applications to either eliminate many organic photoinitiators, or at least reduce the quantity used. This need is, in some cases, driven by economics, as photoinitiators can be expensive. Some performance issues have become more apparent over time, e.g., photoinitiator residue left after cure may compromise the solvent resistance of the cured ink or coating by acting as a plasticizer. In applications such as packaging articles, there are growing health and safety concerns. For example, in printed materials in contact with food products, pharmaceuticals and cosmetics, unreacted photoinitiator and photoinitiator fragments may migrate through the printed substrate and contaminate the product contained therein.

A significant obstacle that must be overcome in many free-radical, energy curing processes is the presence of oxygen. Oxygen inhibition interferes with curing by acting as a bi-radical, which can react with the radicals formed by the photoinitiator, or radicals formed on the monomer or the growing polymer chain. This terminates the chain reaction and leads to insufficient curing in the ink.

Due to oxygen inhibition, formulations cured by exposure to UV light, e.g., (meth)acrylate systems, typically require a certain minimum amount of photoinitiator just to overcome the presence of oxygen in the formulation before any visible evidence of curing appears. Widely held scientific consensus assumes that without steps being taken to address the oxygen present, approximately 3% to 4% of photoinitiator is consumed by reactions with the residual oxygen in a formulation before the free-radical polymerization or crosslinking reaction can begin. As a result, photoinitiator content of commercial acrylate-based systems that cure at acceptable exposure levels of UV light (approx. 150 mJ/cm$^2$) at a coating thickness of around 2 microns, can vary from as little as 6% photoinitiator up to 15% photoinitiator, typically a blend of Type-1 and Type-2 photoinitiators.

Clark et al. disclose a number of techniques for lowering the impact of oxygen on energy cured coatings. (Strategies to Reduce Oxygen Inhibition in Photoinduced Polymerization; Samuel Clark Ligon, Branislav Husár, Harald Wutzel, Richard Holman and Robert Liska, *Chemical Reviews* (2014), 114, p. 557-589). These techniques include using a higher intensity of activating radiation, and placing a barrier between the curing composition and the oxygen, e.g., blanketing the surface with an inert gas, placing the curing composition behind a glass or quartz barrier, or covering the compositions with a wax, oil or resin. Some of these methods may be inappropriate for an industrial-scale continuous coating line.

US 2019/0389236 now U.S. Pat. No. 11,235,610 discloses a wet-trapping method for preparing a printed article, comprising: applying to a substrate one or more energy-curable ink or coating layers (A) containing one or more photoinitiators; applying to the substrate one or more energy-curable ink or coating layers (B) containing no photoinitiators; and curing all coating and/or ink layers simultaneously at the end of the print run. Less overall photoinitiator can be used because layers containing little or no photoinitiator are still capable of curing, presumably due to radical initiating or propagating species required for cure diffusing from layers containing photoinitiators into those with little or no photoinitiator. The overall process of this method is likely aided by protection of the radiation curable inks from oxygen, i.e., from the bottom by a sealed coating, and from the top by a topcoat. Full curing can be obtained with only ⅕ to ⅛ of the typical initial photoinitiator concentration used in similar, more traditional prepared UV cured laminates.

US 2020/0369065 now U.S. Pat. No. 11,707,945 discloses a method for placing a barrier between oxygen and a curing composition where energy curable inks containing lower levels of photoinitiators than commonly used, are wet trapped (overcoated with a water-based coating) and then cured, providing a printed article having properties equal to or better than traditional energy curable inks with high levels of photoinitiators.

WO 2021/211662 discloses that adequate energy curing can also occur in a system wherein one or more layers of ink compositions containing no photoinitiator, or very low levels of photoinitiator, are coated by a non-energy curable coating layer comprising photoinitiator.

Other methods for lowering the photoinitiator content include adding co-initiators or synergists that accelerate curing or prolong the amount of curing time created by radiation. Curing time here includes the time after radiation ends in which continued polymerization occurs. The use of amines and acrylated amines as synergists with photoinitiators is well known, e.g., see Acrylated Amine Oligomers to Enhance Cure with UV-LED Sources, James E. Goodrich et al., *Painting and Coatings Industry*, Jul. 20, 2020.

Organic peroxides have been used as free radical sources for initiating polymerization of unsaturated organic materials for about 80 years. Organic peroxides are often used as thermal initiators. Industrially, the largest uses are in the plastics and rubber industries, where they are used in polymerization processes as activators, cross-linking agents, accelerators, curing agents, hardeners and thermal initiators.

Organic peroxides are also used along with photoinitiators in so called UV initiated "dual-cure" systems. Virtually all such systems are considered "two-step" systems where an initial "fast" step provides a cured article with some initial, 'green' strength followed by a "thermal" step that provides further polymerization. The fast step is exposure to UV light, typically of a (meth)acrylate system containing photoinitiator, which part of the reaction is completed in fractions of a second. The thermal step typically involves heating the partially cured system to a temperature that reduces the half-life of the organic peroxide to minutes or tens of minutes long, and then holding at the higher temperature to drive the reaction to completion, typically about an hour or more.

Bailey and Wolf disclose a dual cure system wherein an organic peroxide is added as a co-initiator to a UV curable system containing benzophenone and bis phenyl phosphine oxide photoinitiators. (Formulation and Performance Advances in (Meth)Acrylate based Sealants: A UV/Peroxide Dual Cure Feasibility Study; Michael Bailey, William Wolf, RadTech Conference 2014). The composition is exposed to radiation and then provided with time for a secondary thermal cure. This results in enhanced performance in curing by overcoming UV curing limitations encountered in certain high end sealant applications, e.g., providing complete cure in shadow areas where light penetration is obstructed and greater depth of cure in thick, optically dense compositions.

Kim et al. disclose a dual cure system comprising a photoactive redox couple, wherein one component of the couple comprises an ammonium ion, and an organic peroxide (Solvent-Free Radical Photo-Polymerization with Dark Curing; Kangmin Kim, Jasmine Sinha, Charles B. Musgrave and Jeffrey W. Stansbury; RadTech Conference 2020). The exemplified redox couple consists of 4-(dimethyl-4-toluidinyl) benzophenone and tetraphenyl borate, which initiates photopolymerization during UV exposure, to produce polymers and free amine. When UV exposures ceases, the amine and the peroxide produce radicals in a "dark reaction", i.e., not light activated, that continues without additional added energy, i.e., no heat is added to the reaction.

Despite the progress to date, additional, more effective alternatives to traditional organic photoinitiators are needed. For example, further reduction or elimination of traditional photoinitiators from energy curable formulations, elimination of the need for a "fast step" and "slow step" in dual cure compositions, shorter overall cure times for systems employing peroxides in "dark reactions" are all desirable features. The present invention addresses these issues.

BRIEF SUMMARY OF THE INVENTION

It has been found that addition of organic peroxides to an energy curable composition can allow for reduction in the amount of traditional photoinitiators without negatively impacting cure, while providing excellent properties not obtained by the use of photoinitiator alone. Further, it has been found that the combination of organic peroxides and amines can initiate curing of energy curable ink or coating compositions to produce cured inks or coatings with enhanced properties, using little or none of the traditional organic photoinitiator typically employed. Excellent results have been obtained in curing multi-layer ink/coating constructs wherein the peroxide and amine are in different layers, which also addresses some of the safety issues associated with peroxides mixed with other active materials, by allowing a formulated peroxide composition to be stored and then used separately from an amine containing formulation, without having to combine them.

In one broad embodiment, the present invention provides a method for preparing a cured multi-layer print construct, the method comprising:
a) providing a substrate;
b) providing one or more energy-curable compositions (A), comprising:
   i) one or more energy curable monomers, oligomers and/or polymers comprising ethylenically unsaturated functional groups capable of polymerizing or crosslinking under actinic radiation; and
   ii) wherein at least one of the one or more energy-curable compositions (A) comprises an amine;
c) providing one or more non-energy-curable compositions (B), comprising:
   i) resins that do not comprise reactive functional groups capable of polymerizing or crosslinking under actinic radiation, and
   ii) one or more organic peroxides
d) applying the one or more compositions (A) onto the substrate as energy-curable ink layers;
e) applying the non-energy-curable compositions (B) as one or more coating layers on top of the one or more ink layers of compositions (A);
f) curing all of the ink layers of composition (A) simultaneously by a single exposure to an external energy source to create a cured print construct;
wherein the one or more compositions (B) are dried either before step f), or at the end after step f).

The topcoat may be dried by any means, e.g., by forced air, etc. but in many cases, the top coat dries on standing at ambient temperature. In the appended Examples, the top coat was typically allowed to dry on the bench top, and often, the top coat was not fully dried when exposed to UV.

In many embodiments, one or more of the energy curable compositions (A) comprises one or more energy curable (meth) acrylate monomer, oligomer and/or polymer.

The amine of the energy curable composition(s) (A) can comprise:
a) an acrylated amine, and/or
b) a simple amine, i.e., an aromatic, alkyl, or alkanol amine, wherein the aromatic, alkyl, or alkanol amine does not contain an ethylenically unsaturated group capable of reacting with the ethylenically unsaturated functional groups of the energy-curable monomers, oligomers and/or polymers.

When present, acrylated amines are typically used in an amount from 5-25 wt % based on the total weight of the composition. Simple amines, when present, are typically present in an amount of from 1-6 wt %, based on the total weight of the composition. Mixtures of amines may be present including a mixture comprising 5-25 wt % acrylated amines and 1-6 wt % non-acrylated amines based on the total weight of the composition.

In most embodiments, at least one, and often more than one, of the energy curable compositions (A) comprises a dye and/or pigment.

In many embodiments, the one or more non-energy-curable compositions (B) are water-based and in certain embodiments, the method further comprises a step between steps e) and f) for drying the one or more coating layers formed from the non-energy-curable compositions. Typically, at least one of the non-energy-curable composition (B) comprises 3-8% wt % of organic peroxide, based on the total weight of the composition.

In some embodiments at least one of the one or more energy curable compositions (A) comprise photoinitiators in an amount of ≤5.5 wt % based on the total weight of the composition, for example, ≤4%; for example, ≤3% or ≤2%, and in some embodiments ≤1%.

In other embodiments none of the energy compositions (A) comprise a photoinitiator.

The substrate can be non-porous or porous. For example, common porous substrates include paper, non-woven paperboard or woven paperboard, and non-porous substrates include polymer films or metal foil. In many embodiments the substrate can be a porous or non-porous substrate flat sheet or web.

In some embodiments, the ink and coating layers are fully cured within 2 hours after exposure to UV energy.

These and other objects, advantages, and features of the invention will become apparent to those persons skilled in the art upon reading the details of the formulations and methods as more fully described below.

DETAILED DESCRIPTION OF THE INVENTION

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

The present invention provides an alternate method for curing multilayer EC compositions, such as inks, coatings, adhesives etc., which method makes use of an organic peroxide in one layer and a select amine in a separate layer to generate the radicals needed for cure. Surprisingly, the present method provides excellent cure while using little to no organic photoinitiator.

The discovery that the amine and peroxide will provide curing when used in separate layers of the printing construct also allows one to store the ink and coating compositions separate from each other, without degradation of the peroxide containing component.

It is also shown herein that at least some of the organic photoinitiator in a standard EC-curing composition can be replaced with peroxide, without interfering with cure, and a higher amount of cure can be obtained.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

When the terms "consist of", "consists of" or "consisting of" is used in the body of a claim, the claim term set off with "consist of", "consists of" and/or "consisting of" is limited to the elements recited immediately following "consist of", "consists of" and/or "consisting of", and is closed to unrecited elements related to that particular claim term. The term 'combinations thereof', when included in the listing of the recited elements that follow "consist of", "consists of" and/or "consisting of" means a combination of only two or more of the elements recited.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes all values within that range, including the endpoints, and all narrower ranges within that range, whether specifically recited or not.

As used herein, the term "opacity" of a pigmented ink or coating refers to its ability to cover the color or color differences of a substrate. Opacity depends on the amount of light that is transmitted through, or reflected from, the surface of the ink. More opaque colorants have a greater tendency to reflect and refract light. "Color density", also referred to as "optical density", is a measurement of degree of opacity of an image. The standard method used to assess color density in the graphic arts is reflection densitometry (as opposed to transmission densitometry more often used in the plastics industry and for other semi-transparent materials). Briefly, to arrive at optical density, the reflectance of the image is measured, R=Reflectance For a perfectly reflective surface, R=100%

For a perfectly absorptive surface, R=0%

And density is calculated using the formula:

| $D = \text{Density}; D = \log_{10}(1/R);$ | |
| --- | --- |
| For R = 100% | D = 0.00 |
| For R = 50% | D = 0.30 |
| For R = 10% | D = 1.00 |
| For R = 5% | D = 1.30, and so on |

As used herein, the terms "(meth)acrylate," "(meth) acrylic acid," or "acrylate" include both acrylate and methacrylate compounds, and both acrylic acid and methacrylic acid, unless specified otherwise.

As used herein, the term "polymer" includes both homo- and co-polymers.

As used herein, the terms "ink or coating composition(s)," "inks and/or coatings," "inks and coatings," "inks or coatings," "coating composition(s)," "ink composition(s)," "coating(s)," "ink(s)," "compositions" and the like are used interchangeably. As used herein, coatings and related terms include inks, and vice-versa.

As used herein, "substrate" means any surface or object to which an ink or coating can be applied. Substrates include, but are not limited to, cellulose-based substrates, paper, paperboard, fabric, leather, textiles, felt, concrete, masonry, stone, plastic, plastic or polymer film, glass, ceramic, metal, wood, composites, combinations thereof, and the like. Substrates may have one or more layers of metals or metal oxides, or other inorganic materials.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

As used herein, "energy-curing" (EC) refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention. Compositions of the current invention are especially suited for use in compositions curable under the action of UV light and/or electron-beam.

As used herein, "monomer" refers to a small molecule having one or more functional groups. Monomers react with other monomers, either the same or different, to form monomer chains (oligomers and/or polymers). Each monomer in a chain is a monomer repeating unit. A monomer is the smallest unit that makes up an oligomer or a polymer. A monomer is a low molecular weight molecule, usually less than or equal to 100 Daltons weight average molecular weight (Mw).

As used herein, "oligomer" refers to a chain of a few monomer repeating units. Oligomers are a few to several monomer units long chains, and have a mid-range weight average molecular weight of about 100 Daltons to about 10,000 Daltons.

As used herein, "polymer" refers to a large molecule, containing multiple monomer and/or oligomer repeating units. Polymers are high molecular weight molecules, having a weight average molecular weight of greater than about 10,000 Daltons.

Compositions and Uses Thereof

In one embodiment of the invention:
a) one or more energy curable ink or coating compositions, typically one or more energy curable ink compositions, are applied in layers to a substrate, wherein at least one energy curable layer comprises an amine;
b) before curing the energy curable layers, one or more non-energy curable compositions, wherein at least one non-energy curable composition comprises an organic peroxide, is applied as a coating over the wet energy curable layers;
c) the multilayered system thus created is exposed to actinic radiation to cure the layers containing energy curable compositions.
d) The non-energy curable layers can be dried or cured before, during or after exposure to actinic radiation.

Typically, excellent results have been achieved without the presence of traditional organic photoinitiators. Depending on the specific inks and substrates, the presence of a small amount of traditional photoinitiator may be used.

In general, the compositions containing the peroxide and the amine are not mixed prior to application to the substrate.

The energy curable compositions can comprise any of the monomers, oligomers and/or polymers used in the art. In many embodiments, the energy curable monomers, oligomers and/or polymers will comprise at least one group selected from acrylate, methacrylate, cyclic lactam; N-vinyl oxazolidinone and N-vinyl pyrrolidone, and/or acrylamide groups. Multifunctional ethylenically unsaturated monomers oligomers and/or polymers are often used, i.e., reactive compounds comprising more than one reactive group, e.g., di, tri, tetra acrylates, or compounds comprising two or more different reactive groups. In many embodiments, the energy curable compositions comprise an acrylate or methacrylate.

Simple amines or alkanolamines are often present in the energy curable compositions of the invention at 1%-6% or 2%-5% by weight, based on the total weight of the composition.

Simple amines include aromatic amines such as: 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino) benzoic acid, with ethyl, amyl, 2-butoxyethyl and 2-ethylhexyl esters; other positional isomers of N,N-dimethylamino)benzoic acid esters, e.g., esters with ethyl, amyl, 2-butoxyethyl and 2-ethylhexyl esters being particularly preferred; Aliphatic amines include a variety of secondary and tertiary alkylamines, and alkanolamines include, e.g., N-methyldiethanolamine, triethanolamine, tri-isopropanolamine and the like.

Amino acrylates, when used, are typically present from 5%-25 wt %, 6%-20%, or 8%-15% by weight, based on the total weight of the composition. Aminoacrylates include, e.g., amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER P077F, all available from BASF; AGISYN 701, AGISYN 702, AGISYN 703, NeoRad P-81 and NeoRad P-85 all available from DSM-AGI; MIRAMAR AS1000, MIRAMAR AS3500, MIRAMER LR3600, PHOTOCRYL A104, PHOTOCRYL DP143, MIRAMER AS2010, PHOTOCRYL A101, PHOTOCRYL A102 from MIWON.

The EC inks and coatings of the invention (i.e. compositions (A)) may include non-energy curable resins, including e.g., alkyds, phenolics, nitrocellulose, polyamides, vinyls, acrylics, rosin esters, hydrocarbons, polyurethane, epoxies, polyesters, styrenes, urea, melamine-formaldehydes, etc.

The non-EC ink or coating compositions (i.e. compositions (B)) comprising the organic peroxide will generally comprise one or more resins that are chemically inert to the actinic conditions, including poly(ester), poly(urethanes), poly(amides), ketone resins, aldehyde resins, alkyd resins, phenol-formaldehyde resins, rosin resins, hydrocarbon resins, or mixtures of the aforementioned, etc.

The inks and coatings are applied to the substrate using conventional techniques in the art. Similarly, exposure to UV light is carried out according to common procedures. Specific examples of UV exposure conditions are found in the Examples section.

Organic peroxides useful in the present invention include ketone peroxides, diacyl peroxides, dialkyl peroxides, percarbonates, hydroperoxides and peroxyesters, among others. In specific Examples found herein, it was seen that while various organic peroxides were effective in initiating cure, tert-butyl perbenzoate was highly effective in comparison. In an aging study it was shown that at commercially interesting levels, a water-based acrylic coating containing either tert-butyl perbenzoate or di-tert butyl peroxide remained active at original levels of chemical activity in excess of 180 days and was capable of initiating cure upon exposure to UV light just as effectively when aged as when fresh.

In experiments supporting the present invention, it was shown that a portion of the photoinitiator can be replaced with organic peroxide without compromising the cure properties of an acrylate coating. In this instance the solvent rub resistance, which is seen as indicative of the level of cross-linking in the cured system, can be significantly improved by incorporation of peroxide initiators well beyond what is capable using photoinitiator alone. It has been previously claimed that photoinitiator content in ink may be reduced by an order of magnitude and still generate full cure when ink+photoinitiator is wet trapped under a non-photocured coating such as water-based or solvent-based (see publication WO 2019/160833). In one embodiment of the present invention, this same construction substituted a mix of photoinitiator and organic peroxide, reducing the photoinitiator content still further.

In another embodiment it was shown that photocuring could be achieved even when photoinitiator was entirely removed from the system. Some evidence of partial photocuring was seen when organic peroxide was added to an ink layer, which was wet-trapped under a water-based coating containing amine, and then exposed to UV light. However, when amine was added to the ink layer that was wet-trapped under a water-based coating containing organic peroxide, and then exposed to UV light, a level of cure at exposure levels and speeds comparable to commercial systems using photoinitiators was achieved.

The present invention shows that organic peroxides incorporated into (meth)acrylate compositions are capable of driving polymerization reactions under exposure to UV light without the need for a "fast" initiator such as classic photoinitiators, and that commercially acceptable levels of cross-linking can be achieved. This has not been previously shown in the literature. Finished properties of commercial interest can be observed immediately upon printing/coating through exposure to UV light when organic peroxides are the sole initiator present. Properties of commercial interest have been demonstrated where the reactive ink/coating is present beneath a non-reactive coating such as (but not limited to) water-based acrylic coatings, that are exposed to UV light with organic peroxide being the sole known source of free radicals. Of particular interest are situations where reactive (meth)acrylate resins containing amines are sandwiched between the printing/coating substrate and a non-reactive coating containing organic peroxide, and the composite is then irradiated with UV light.

The mechanism by which peroxides initiate polymerization reactions is usually referred to in the literature as a thermal process. The most common mechanism for these reactions is based on the half-life of the peroxide which is relatively short due to the instability of the $R_1$—O—O—$R_2$ bond. Free radicals are generated when the bond between the oxygen atoms is severed; the stability of which decreases exponentially with increasing temperature.

However, the results presented herein provide evidence to support an argument that organic peroxides can act as "photosensitive free radical generator" in much the same way as traditional photoinitiators.

Examples of Suitable Raw Materials for the Inks and Coatings of the Present Invention Examples of suitable peroxides include ketone peroxides, diacyl peroxides, dialkyl peroxides (e.g. di-t-butyl peroxide), percarbonates and peroxydicarbonates, peroxyketals, hydroperoxides and peroxyesters (e.g. tert-butyl perbenzoate), and di-tert butyl peroxide.

Suitable colorants include but are not limited to: organic or inorganic pigments and dyes. The dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The printing inks and/or coatings of the present invention may also include waxes such as but not limited to amide wax, erucamide wax, polypropylene wax, paraffin wax, polyethylene wax, polytetrafluoroethylene, carnauba wax and the like. The wax may be a combination of said waxes. It is preferred that the wax be a blend of amide and erucamide waxes. The wax, if present, is in an amount of up to about 4 wt %. It is preferred that the wax be present in an amount from about 0 wt % to about 2 wt %.

The radiation curable inks, i.e. compositions (A), of the present invention can be UV-cured by an actinic light source, such as, for example, UV-light, provided by a high-voltage mercury bulb, a medium-voltage mercury bulb, a xenon bulb, a carbon arc lamp, a metal halide bulb, a UV-LED lamp or sunlight. Alternatively, the radiation curable inks of this invention can be cured by electron beam (EB).

Examples of suitable monofunctional ethylenically unsaturated monomers include but are not limited to the following: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acylate; stearyl acrylate; iso-stearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate, and combinations thereof. As used herein, the term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Examples of suitable multifunctional ethylenically unsaturated monomers include but are not limited to the following: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaaacrylate; dipentaerythritol hexaaacrylate; ethoxylated dipentaerythritol hexaacrylate. As used herein, the term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Other functional monomer classes capable of being used in part in these formulations include cyclic lactam such as N-vinyl Caprolactam; N-vinyl oxazolidinone and N-vinyl pyrrolidone, and secondary or tertiary acrylamides such as acryloyl morpholine; diacetone acrylamide; N-methyl acrylamide; N-ethyl acrylamide; N-isopropyl acrylamide; N-t.butyl acrylamide; N-hexyl acrylamide; N-cyclohexyl acrylamide; N-octyl acrylamide; N-t.octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; and N,N'-methylenebisacrylamide, and combinations thereof.

As common in the art, the radiation curable compositions of the present invention, i.e. compositions (A), may also contain inert, non-curable resins having no curable acrylic groups, with a weight number average of 1000-30000 Daltons, preferred 1000-4000 Daltons, such as poly(acrylates), poly(ester), poly(urethanes), poly(amides) ketone resins, aldehyde resins, alkyd resins, phenol-formaldehyde resins, rosin resins, hydrocarbon resins, alkyd resins or mixtures of the aforementioned. Such resins improve pigment wetting, gloss, rheology and flexibility and the amounts needed is known or can readily be determined by one skilled in the art.

Non energy curable inks and coatings used in the present invention, i.e. compositions (B), typically include inert resins, such as, for example alkyds, phenolics, nitrocellulose, polyamides, vinyls, acrylics, rosin esters, hydrocarbons, polyurethane, epoxies, polyesters, styrenes, urea, melamine-formaldehydes. In many embodiments, one or more acrylate resins are employed.

When photinitiators are used in the invention, they are typically used in small amounts and can include any suitable type or blend of photoinitiators, such as, but not limited to: α-hydroxyketones, acyl phosphine oxides, α-aminoketones, thioxanthones, benzophenones, phenylglyoxylates, oxime esters, acetophenones, anthraquinones, etc., and combinations thereof, including, but are not limited to, the following:

Suitable α-hydroxyketones include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-hydroxy-1-[1-[4-(2- hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl)phenoxy]phenyl]-2-methylpropan-1-one; and combinations thereof.

Suitable acylphosphine oxides include, but are not limited to: 2,4,6-trimethylbenzoyl-diphenylphosphine oxide; ethyl-(2,4,6-trimethylbenzoyl)phenyl phosphinate; bis-(2,4,6-trimethylbenzoyl)-phenylphosphine oxide; and combinations thereof.

Suitable α-aminoketones include, but are not limited to: 2-methyl-1-[4-methylthio)phenyl]-2-morpholinopropan-1-one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; and combinations thereof.

Suitable thioxanthones include, but are not limited to: 2-4-diethylthioxanthone, isopropylthioxanthone, 2-chlorothioxanthone, and 1-chloro-4-propoxythioxanthone; and combinations thereof.

Suitable benzophenones include, but are not limited to: benzophenone, 4-phenylbenzophenone, and 4-methylbenzophenone; methyl-2-benzoylbenzoate; 4-benzoyl methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenonelaurate; 1-[-4-[benzoylphenylsulpho]phenyl]-2-methyl-2-(4-methylphenylsulphonyl)propan-1-one; and combinations thereof.

Suitable phenylglyoxylates include, but are not limited to: phenyl glyoxylic acid methyl ester; oxy-phenyl-acetic acid 2-[hydroxyl-ethoxy]-ethyl ester; oxy-phenyl-acetic acid 2-[2-oxo-2-phenyl-acetoxy-ethoxy]-ethyl ester; and combinations thereof.

Suitable oxime esters include, but are not limited to: 1-phenyl-1,2-propanedione-2-(O-ethoxycarbonyl)oxime; [1-(4-phenylsulfanylbenzoyl)heptylideneamino]benzoate; [1-[9-ethyl-6-(2-methylbenzoyl)carbazol-3-yl]-ethylideneamino]acetate; and combinations thereof.

Examples of other suitable photoinitiators include diethoxy acetophenone; benzil; benzil dimethyl ketal; titanocen radical initiators such as titanium-bis(η5-2,4-cyclopentadien-1-yl)-bis-[2,6-difluoro-3-(1H-pyrrol-1-yl)phenyl]; 9-fluorenone; camphorquinone; 2-ethyl anthraquinone; and the like.

Polymeric photoinitiators and sensitizers are also suitable, including, for example, polymeric Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

As with most ink and coating compositions, additives may be incorporated to enhance various properties. A partial list of such additives includes, but is not limited to, adhesion promoters, light stabilizers, optical brighteners, de-gassing additives, ammonia, flow promoters, defoamers, antioxidants, stabilizers, surfactants, dispersants, plasticizers, rheological additives, waxes, silicones, etc., each of which, when present, are present at levels from about 0.2 wt % to about 3.0 wt %. The inks and coatings of this invention may contain the usual additives to modify flow, surface tension, gloss and abrasion resistance of the cured coating or printed ink. These additives may function as leveling agents, in-can stabilizers, wetting agents, slip agents, flow agents, dispersants and de-aerators. Preferred additives include fluorocarbon surfactants, which may be used at lower levels, silicones and organic polymer surfactants, which are typically used at about 0.5 wt % to about 1.5 wt % however some applications may use some surfactants at levels of 3 wt % or more, and inorganic materials such as calcium carbonate, magnesium carbonate or silica. Clays may be present from about 1 wt % to about 7 wt %, and talcs may be present from about 2 wt % to about 5 wt %. As examples, the TEGORAD product lines (TEGORAD are trademarks and are commercially available products of Tego Chemie, Essen, Germany, now part of Evonik Industries) and the SOLSPERSE product lines (SOLSPERSE are trademarks and are commercially available products of Lubrizol Company).

Suitable solvents for the inks and coatings of this invention may include aliphatic hydrocarbons, cyclic hydrocarbons, aromatic hydrocarbons, ketones, aldehydes, alcohols, ethers, and esters.

Oligomers are substances that provide the vehicle for the UV ink. They are similar to monomers, except that they have already been partially polymerized, which makes them more viscous. During curing, the monomers react with the oligomers to create chains in three dimensions. In the printing industry, mainly resins/oligomers with acrylate functionality are used to provide the necessary reactivity to enable adequate cure for modern, high speed presses.

The main classes of acrylated oligomers includes epoxy acrylates; urethanes acrylates; polyester acrylates; acrylic acrylates; hyperbranched polyester acrylates; waterborne UV polyurethane dispersions and, organic-inorganic hybrid materials.

EXAMPLES

The invention is further described by the following non-limiting examples which further illustrate the invention, and are not intended, nor should they be interpreted to, limit the scope of the invention. All parts and percentages are by weight (wt % or mass % based on the total weight), unless specified otherwise.

Cure

The level of curing of the present compositions after exposure to actinic radiation was measured in various ways. Two tests, thumb-twist resistance and finger-rub resistance are taken as soon as possible after the allotted time for curing has elapsed, i.e. curing time. Curing time may include only the time during which the sample is irradiated, or it may include the irradiation time plus any additional dark time or post curing time. In embodiments when no irradiation occurs, e.g., thermal curing, the cure time is simply time from the beginning of cure until the sample is tested.

A sample exposed to curing conditions passing both the thumb-twist and the finger-rub resistance tests is considered to be successfully cured.

Thumb-Twist Resistance

In the thumb-twist resistance test, the printed portion of a proof is placed over a flat, smooth lab bench surface (preferably glass). Pushing firmly down with the thumb on the printed portion, the substrate was pulled by the other hand in a circular motion through an arc of at least 90° rotation parallel to the bench top. If the printing broke loose from the substrate making the substrate clearly visible through the printing, the proof was judged a failure. If visible marring occurred but the ink did not break through, this was considered a borderline condition. If no visible damage occurred, the test was considered a pass.

Finger-Rub Resistance Test

In the finger-rub resistance test, the printed portion of the proof is also placed over a flat, smooth lab bench surface. Holding the proof steady with one hand, the index finger of the other hand was pushed down firmly into the proof and rubbed back-and-forth 5 times. Each back-and-forth motion was counted as 1 rub. If any material was removed from the printed surface such that the substrate was clearly visible, the proof was judged to be a failure. Visible ink removal was generally accompanied by significant transfer of ink to the finger as a second form of visual verification of failure. If ink was not removed from the substrate, the proof was recorded as a pass.

Solvent Rub Test

The solvent rub test was used to assess ink and coating adhesion to the substrate. A cotton tipped wooden swab was wetted with isopropanol, unless otherwise specified, and rubbed back and forth (i.e. a double rub) on the top layer of the cured construct. The number of double rubs before failure of the cured construct was recorded. Often, failure is abrupt, as when "break through" occurs and the swab penetrates the outer surface of the construct and ink bonded to the substrate is removed. However, as known in the art, the manner in which break through occurs can vary, and in the present tests, only samples exhibiting the same manner of failure are compared. In Example 9, the number of isopropanol 2× rubs before it was visually determined that a majority, i.e., >50%, of the ink had been removed from the substrate was recorded.

Density

Color strength/density was measured using an X-Rite Spectroeye™ spectrodensitometer from X-Rite with the appropriate filter. The X-Rite Spectroeye™ used in the present work is a self-calibrating spectrodensitometer with the following settings: Density St, ANSI T; Illuminant, D50; Observer Angle, 10°.

Printing

In the following Examples, inks were laid down using an offset roller proofing method that is often used in the field and a QUICK PEEK™ rollout system, available currently from Thwing-Albert Instrument Company and others. A QUICK PEEK™ proofer has a smooth flat plate, a steel measuring bar, plunger for obtaining an accurate predetermined volume of ink, and a roller assembly. The roller assembly is typically a nitrile PVC blend roller that can be used with conventional, hybrid, and UV inks and was used to distribute the ink on the plate and make a proof. The required amount of ink was placed in the measuring bar with a steel spatula and then pushed out onto the surface of the roller. The ink was then rolled out onto the plate until evenly distributed on entire surface of plate and roller. The inked-up roller was then rolled out on the desired substrate.

UV flexo inks are used in the present Examples. These inks contain little to no material that is likely to volatize during the processes used herein. Therefore the wet coat weight and the dry coat weight of the UV flexo inks of the Example are considered, for all practical purposes, to be the same.

RYCOLINE 181349, Sun Chemical, is a water-based unreactive coating, which in general terms consists of acrylic emulsion resins in water and additives known to those skilled in the art, with a total solids level of 37.4%.

OMNIRAD 127, IGM Resins, is α-Hydroxyketone photoinitiator, 2 hydroxy-1-{4-[4-(2-hydroxy-2-methyl-propionyl)-benzyl]-phenyl}-2-methylpropan-1-one, FLCWB2445033, now FLCWB 2485033, commercially available from Sun Chemical Corp., is a yellow, lithographic offset EC ink without photoinitiator, which is typically cured by electron beam and comprises: polyester acrylate oligomers, acrylate monomers, organic pigments and small levels of inorganic minerals for control of the ink body, pigment wetting agents, waxes and other materials controlling the ink's surface properties.

LUPEROX A-98 is Benzoyl Peroxide, manufactured by Arkema and obtained from Sigma-Aldrich, now Millipore Sigma.

LUPEROX P is tert-butyl perbenzoate, manufactured by Arkema and obtained from Sigma-Aldrich, now Millipore Sigma.

LUPEROX DI is di-tert-butyl peroxide, manufactured by Arkema and obtained from Sigma-Aldrich, now Millipore Sigma.

GENOPOL AB-2, Rahn USA Corp, is the reaction product of 4-dimethylamino-benzoic acid and ethoxylated trimethylol propane, PHOTOCRYL A-101, Miwon Chemical, as previously mentioned, is the reaction product of tripropyleneglycol diacrylate, (TPGDA) with diethyl amine.

Example 1: Baseline Performance of Photoinitiator in Commercial Ink

Different levels of the α-Hydroxyketone photoinitiator OMNIRAD 127 were added to photoinitiator-free yellow ink, FLCWB2445033 (Sun Chemical), to create inks 1A-1H. The formulas are shown in Table 1.

TABLE 1

| Baseline formulas for studying effects on UV cure of photoinitiator alone | | |
|---|---|---|
| Ink No. | Yellow PI-free Ink (FLCWB2445033) | Photoinitiator (OMNIRAD 127) |
| 1A | 90.01% | 9.99% |
| 1B | 91.49% | 8.51% |
| 1C | 92.99% | 7.01% |
| 1D | 93.93% | 6.07% |
| 1E | 95.03% | 4.97% |
| 1F | 95.95% | 4.05% |
| 1G | 97.06% | 2.94% |
| 1H | 98.04% | 1.96% |

The inks 1A to 1H were printed as described below, and were exposed to low energy and fast belt speed cure conditions in order to more readily differentiate cure between the various examples. A medium pressure mercury vapor lamp was used at 50% power, a nominal power level of 80 W per cm of bulb length. The belt speed through the curing unit was set to 50 m/min (164 f/min). The exposure levels, as measured with a "POWERPUCK" radiometer from EIT, i.e., a self-contained, electro-optic instrument designed to measure and display peak UV irradiance and total UV energy density used in the UV curing process, operating at 1024 samples per second, are shown in Table 2.

TABLE 2

| UV Exposure conditions for the cure optimization study | | |
|---|---|---|
| Radiation Type | Dosage (mJ/cm$^2$) | Intensity (mW/cm$^2$) |
| UV-A | 48.7 | 2572 |
| UV-B | 53.1 | 3081 |
| UV-C | 10.4 | 589 |
| Total: | 112.2 | na |

This exposure corresponds to a commercial run speed where a typical double lamp unit is present with both bulbs operating at 100% power (160 W/cm) of around 200 m/min (over 650 f/min).

Proofs were made on BYK Chart 2810 coated paper of the various inks using a QUICK PEEK proofer to obtain printed samples of each of inks 1A to 1H. Proofs with color density (X-Rite densitometer on Yellow filter) between 1.01 and 1.16 were retained for analysis. An initial test was made on the samples directly out of the curing unit for thumb twist resistance and finger rub resistance to determine breaking loose and smearing of the ink respectively. Initial isopropanol rub tests were taken approximately 10 minutes after cure. After 60 minutes, two more isopropanol rub tests were made on replicates of the sample. The upper limit of the test was 200 double rubs. No tests achieved rub values in excess of 200 double rubs (see Table 3).

As stated above, if no visible damage occurred during the thumb twist resistance test, the test was considered a pass. Failure modes include the printing broke loose from the substrate making the substrate clearly visible through the printing. A borderline condition is if visible marring occurred but the ink did not break through.

As stated above, if no ink was removed from the substrate, during 5 back and forth rubs of the finger-rub resistance test the test was recorded as a pass. In these tests, the isopropanol rub results are only a guide to demonstrate level of post-cure.

The data in Table 3 shows no statistically significant difference in the Isopropanol Rub test between the initial result and the 60-minute post-cure samples. As can be seen, the optimal level of OMNIRAD 127 in these examples is 5-7 wt %. Examples 1A and 1B, which have photoinitiator levels above this range, and Examples 1F, 1G and 1H, which have photoinitiator levels below this range, failed the finger rub resistance tests, while Examples 1C, 1D and 1E, with photoinitiator levels within 5-7 wt % passed.

The screening above establishes baseline amounts of a specific photoinitiator (OMNIRAD 127) for use in further cure testing. It is well known by one skilled in the art that other levels and types of photoinitiators could be used in formulations and still be within the scope of the present invention.

Example 2: Performance of Photoinitiator and Peroxide Combinations

Combinations of OMNIRAD 127 photoinitiator and LUPEROX A-98 benzoyl peroxide were added to the yellow ink of Example 1 to obtain inks 2A to 2D, at the levels shown in Table 4 in order to determine whether peroxide could compensate for low photoinitiator level.

TABLE 4

| Formulation of inks 2A to 2D | | | |
|---|---|---|---|
| Ink No. | Yellow PI-free Ink FLCWB2445033 | Photoinitiator | Benzoyl Peroxide |
| 2A | 94.51% | 3.04% | 2.45% |
| 2B | 92.95% | 4.51% | 2.54% |
| 2C | 93.00% | 3.00% | 4.00% |
| 2D | 91.23% | 4.53% | 4.24% |

Proofs prepared as above using the inks of Table 4 were exposed to a medium pressure mercury vapor lamp using the same conditions of Example 1. The tests for thumb twist, finger, rub and solvent rub resistance were performed as previously described, immediately after exposure, and one hour thereafter (see Table 5).

TABLE 3

| Resistance Test Results for the ink formulas in Table 1. | | | | | |
|---|---|---|---|---|---|
| | | | | Average Isopropanol Rubs Resisted | |
| Ink No. | Color Strength (Y Density) | Photoinitiator OMNIRAD 127 | Thumb twist Resistance | Finger-Rub Resistance | 10 min after exposure | 60 min post-cure |
| 1A | 1.01 | 9.99% | Pass | Fail | 6 | 3 |
| 1B | 1.10 | 8.51% | Pass | Fail | 8 | 10 |
| 1C | 1.12 | 7.01% | Pass | Pass | 28 | 28 |
| 1D | 1.14 | 6.07% | Pass | Pass | 28 | 28 |
| 1E | 1.07 | 4.97% | Pass | Pass | 12 | 30 |
| 1F | 1.12 | 4.05% | Pass | Fail | 40 | 48 |
| 1G | 1.11 | 2.94% | Pass | Fail | 40 | 30 |
| 1H | 1.09 | 1.96% | Pass | Fail | 18 | 24 |

TABLE 5

Resistance Test Results for inks 2A to 2D

| Ink No. | Color strength (Y density) | Thumb twist Resistance | Finger-Rub Resistance | Average Isopropanol Rubs Resisted | |
|---|---|---|---|---|---|
| | | | | 10 min post exposure | 60 min post-cure |
| 2A | 1.11 | Pass | Fail | 22 | 43 |
| 2B | 1.03 | Pass | Pass | 95 | >200 |
| 2C | 1.08 | Pass | Fail | 45 | 178 |
| 2D | 1.06 | Pass | Pass | 90 | 127 |

The solvent rub resistance data for these inks exhibits significant differences between the inks. Not only are the initial rub resistance values of the peroxide containing formulas significantly higher than those without peroxide, but there is also a very large increase in solvent rub resistance upon 60 minute post-cure that was not seen when photoinitiator alone initiated the reactions. The isopropanol rub resistance test was capped at 200 double rubs, but 6 individual tests exceeded that level when peroxide was added to the initiator system. The dramatic increases in solvent rub resistance, exceeding what can be achieved in ink using photoinitiator alone, shows the strong synergy between photoinitiator and peroxide.

The above results show that it is possible to reduce the photoinitiator content of the ink, from 6.0 wt %, the center of the photoinitiator range in Example 1, to 4.5 wt % in inks 2A to 2D, and achieve the same cure under identical cure conditions, while getting better resistance properties, by adding peroxide to the ink. Thus, at low levels of photoinitiator, increased peroxide levels are capable of improving solvent resistance to levels more than twice the best achievable levels with photoinitiator alone.

Example 3: Baseline Performance of Photoinitiator in Wet Trapped Ink System

These examples explore the synergy between photoinitiators and peroxides in systems prepared following the wet-trap method of US 2020/0369065, wherein required photoinitiator levels have been reduced by overcoating uncured ink layers comprising photoinitiators with a typically water-based coating prior to cure.

A photoinitiator baseline for the wet trapped ink systems was determined using ink samples comprising the yellow, photoinitiator free ink FLCWB2445033 (Sun Chemical) mixed with various levels of OMNIRAD 127, inks 3A to 3E, according to Table 6. FLCWB2445033 with no photoinitiator was used as a control. Inks 3A to 3E were printed using a QUIK-PEEK hand printer on BYK 2810 coated paper. The wet ink was over-coated with RYCOLINE 841349 water-based acrylic coating using a 4.23 bcm×360 lpi un-bladed hand proofer and air dried. The proofs were then exposed to UV light from a medium pressure mercury vapor lamp at 160 W/cm and a conveyor speed of 40 m/min. Proofs were tested shortly after curing for thumb twist resistance, resistance to finger smearing/smudging, and isopropanol rub resistance as in the previous Examples. Results are shown in Table 6.

TABLE 6

Cure of inks 3A to 3E

| Ex. No. | OMNIRAD 127 | Thumb Twist Resistance | Finger-rub Resistance | IPA Resistance Avg (2X Rubs) |
|---|---|---|---|---|
| control | 0.00% | Wet, Fails | Wet, Smears | 6 |
| 3A | 0.19% | Dry, Fails | Dry, Smudges | 13 |
| 3B | 0.29% | Passes | Passes | 21 |
| 3C | 0.40% | Very Good | Very Good | 20 |
| 3D | 0.60% | Excellent | Excellent | 22 |
| 3E | 0.79% | Excellent | Excellent | 19 |

As seen in Table 6, under these wet trapping conditions, a bare minimum of 0.40 wt % photoinitiator OMNIRAD 127 results in acceptable cure performance, but excellent performance occurs at slightly higher photoinitiator concentrations, e.g. 0.6-0.8% by weight.

Synergy with peroxides was tested using the set of ink compositions containing photoinitiator OMNIRAD 127 and benzoyl peroxide, inks 3F to 3J shown in Table 7. The inks were proofed, coated and exposed to UV light from a medium pressure mercury vapor lamp as above to determine the effect of organic peroxide on UV curing in combination with OMNIRAD 127.

TABLE 7

Formulation of inks 3F to 3J

| Ex. No. | % OMNIRAD 127 Photoinitiator | % Peroxide |
|---|---|---|
| 3F | 0.45 | 0 |
| 3G | 0.45 | 3.00 |
| 3H | 0.30 | 1.50 |
| 3I | 0.15 | 0 |
| 3J | 0.15 | 3.00 |

Thumb twist tests were performed initially after exposure to UV (data in Table 8) and at 45 minutes post-exposure to UV (data in Table 9). The initial results, Table 8, did not seem to support a strong case for synergy. Even at the anticipated optimum of 0.45% photoinitiator and 3.0% peroxide, one out of three replicates failed to achieve acceptable thumb twist results. However, within a few minutes the test results began changing dramatically. Change stopped at 45 minutes post-curing.

As one skilled in the art would expect from a UV cured formulation, the results from the sample with 0.45% photoinitiator and no peroxide did not change during the aging process. However, without adding heat, as in traditional dual cure systems, the cure in examples with 3 wt % peroxide increased significantly over the 45 minutes from unacceptably low to commercially acceptable levels on replicates. The level of OMNIRAD 127 in Example 3J at 0.15% is only 30% of the level required for consistently good cure under a coating in the previous Example, suggesting that the main curing activity comes from the peroxide rather than the photoinitiator.

TABLE 8

Thumb Twist Test results of inks 3F
to 3J, 5 minutes after UV exposure

| Ex. No. | % OMNIRAD 127 Photoinitiator | % Benzoyl Peroxide | Test 1 | Test 2 | Test 3 |
|---|---|---|---|---|---|
| 3F | 0.45 | 0 | Dry, Fail | Pass | Pass |
| 3G | 0.45 | 3.00 | Dry, Fail | Pass | Pass |
| 3H | 0.30 | 1.50 | Dry, Fail | Dry, Fail | Dry, Fail |
| 3I | 0.15 | 0 | Wet, Fail | Dry, Fail | Dry, Fail |
| 3J | 0.15 | 3.00 | Dry, Fail | Dry, Fail | Pass |

TABLE 9

Thumb Twist Test results of inks 3F
to 3J, 45 minutes after UV exposure

| Ex. No. | % OMNIRAD 127 Photoinitiator | % Benzoyl Peroxide | Test 1 | Test 2 | Test 3 |
|---|---|---|---|---|---|
| 3F | 0.45 | 0 | Dry, Fail | Pass | Pass |
| 3G | 0.45 | 3.00 | Pass | Pass | Pass |
| 3H | 0.30 | 1.50 | Dry, Fail | Dry, Fail | Dry, Fail |
| 3I | 0.15 | 0 | Wet, Fail | Dry, Fail | Wet, Fail |
| 3J | 0.15 | 3.00 | Pass | Pass | Pass |

For the thumb twist analysis, peroxide is a proven contributor to cure in an ink protected from rapid oxygen infiltration under a layer of water-based coating.

The data above show that the addition of organic peroxides to a coated wet trap system allows the level of photoinitiator to be reduced even farther. Evidence is provided that the main source of cure is coming from the peroxide rather than the photoinitiator. The significant amount of "post-cure" without added heat is also remarkable.

Example 4: Cure with No Photoinitiator in Wet Trapped Ink System

Three variations of curing in absence of traditional photoinitiators were examined. In one variation, a wet trap ink/coating system using only peroxide in the top, coating layer as initiator was subjected to UV exposure. The other two variations examine the use of a peroxide plus amine as initiator, wherein the peroxide and amine are in separate layers. In one variation, the amine is added to the top, non-reactive coating and the peroxide is added to the energy curable ink; and in the other variation the peroxide was added to the top, non-reactive coating and the amine was added to the energy curable ink 4-1 Peroxide Alone in Coating; No Photoinitiator, No Amine Synergist It was investigated whether the presence of a peroxide in the upper coating layer, without any co-initiator, will achieve UV curing of a photoinitiator-free EC ink.

Photoinitiator-free, yellow FLCWB2445033 ink, was printed on BYK Chart 2810 using a QUICK PEEK roller proofer. A coating comprising 88.3% RYCOLINE 841349; 8.3% Glycerol; and 3.3% benzoyl peroxide was prepared and rolled out over wet ink using a 165 lpi×14 bcm anilox with a 2-roll handproofer, and air-dried at room temperature. The resulting layered system was exposed to UV light from a medium pressure mercury lamp at 100% power (160 W/cm) at a belt speed of 21.3 m/min (70 fpm), to produce construct 4-1. The results are shown in Table 10.

TABLE 10

Cure of construct 4-1

| Post-Cure Time | Observations on Curing of 4-1 |
|---|---|
| 1 minute | Wet, coating/ink smears when touched |
| 5 minutes | Dry to the touch, but still smears |
| 17 minutes | No change |
| 141 minutes | Feels drier, but still smears |
| 1320 minutes | Dry, marginally passes thumb twist test |

The data shows that it is possible to cure a photoinitiator-free EC ink without the use of photoinitiator by shining UV through an otherwise inert coating containing organic peroxide. The curing can be achieved over a time similar to the curing of conventional sheetfed printing inks. However, curing is very slow compared to other Examples presented herein.

4-2 Peroxide and Amine in Separate Layers; No Photoinitiator

Curing systems comprising an organic peroxide in one ink or coating layer and an amine in a separate ink or coating layer were explored using the wet trap method above. Adding the amine and organic peroxide to separate layers provides advantages as it prevents any reaction in storage between the peroxide and the amine, which could potentially be exothermic and dangerous. In one experiment, the amine was put in the top, non-reactive coating and the peroxide in the ink, and in another experiment the peroxide was put in the top, non-reactive coating and the amine in the ink.

4-2A: Peroxide in Ink/Amine in Coating

The following ink and coating compositions were prepared.

TABLE A

| 4-2A-C: Non-EC Coating Composition | |
|---|---|
| RYCOLINE 841349 | 94.6% |
| Non-EC, acrylic coating composition | |
| EHA | 5.4% |
| 2-Ethylhexyl-4-dimethylaminobenzoate | |

TABLE B

| 4-2A-I: EC Ink Composition | |
|---|---|
| FLCWB2445033 | 92.9% |
| EC-Yellow Ink containing no initiators | |
| benzoyl peroxide | 7.1% |

The weight percent of benzoyl peroxide chosen is roughly intermediate to the combined weight percent of photoinitiator and peroxide that was used successfully in Examples 2B and 2D to cure the same ink (see Tables 4 and 5).

The above ink, 4-2A-I, was printed on BYK Chart 2810 coated paper, overprinted while wet with the above coating, 4-2A-C, air-dried according to the procedures of Example 4-1, then exposed to a UV mercury vapor lamp at various speeds and 100% power (160 W/cm), to produce construct 4-2A. Results are shown in Table 11.

TABLE 11

Cure performance of construct 4-2A

| Conveyor Speed (m/min) | Time for Proof to become Dry to Touch (min) | Dry Rub Resistance (cotton ball)* 20 hr Post-UV Cure | Thumb twist Resistance 20 hr Post-UV Cure |
|---|---|---|---|
| 21.3 | 20 | Very Slight Rub-off | Fail |
| 32.0 | 60 | Very Slight Rub-off | Fail |
| 42.7 | >400, <1000 | Moderate Rub-off | Fail |

*A cotton ball was used instead of a cotton tipped wooden swab due to supply difficulties.

This construct of amine in coating and peroxide in the ink did not produce passing cure results.

4-2B: Peroxide in Coating/Amine in Ink

The following ink and coating compositions were prepared.

TABLE C 4-2B-C: Non-EC Coating Composition

| RYCOLINE 841349 Non-EC, acrylic coating composition | 88.3% |
|---|---|
| Glycerol | 8.3% |
| benzoyl peroxide | 3.3% |

TABLE D 4-2B-I: EC Ink Composition

| FLCWB2445033 EC-Yellow Ink containing no initiators | 94.4% |
|---|---|
| EHA 2-Ethylhexyl-4-dimethylaminobenzoate | 5.6% |

The level of benzoyl peroxide in the unreactive water-based acrylic coating 841349 is in the same range as was used in the ink in Examples 2B and 2D that successfully cured the same ink in Example 1 (see Tables 4 & 5).

The above ink, 4-2B-I, was printed on BYK Chart 2810 coated paper, overprinted while wet with the above coating, 4-2B-C, air-dried according to the procedures of Example 4-1, then exposed to a UV mercury vapor lamp at various speeds and 100% power (160 W/cm), to produce construct 4-2B. Results are shown in Table 12.

TABLE 12

Cure performance of construct 4-2B

| Conveyor Speed (m/min) | Time for Proof to become Dry to Touch (min) | Dry Rub Resistance (cotton ball) 20 hr Post-UV Cure | Thumb twist Resistance 20 hr Post-UV Cure |
|---|---|---|---|
| 21.3 | 5 | No Rub-Off | Pass |
| 32 | 15 | No Rub-Off | Pass |
| 42.7 | 15 | No Rub-Off | Pass |
| 53.3 | <60 | No Rub-Off | Pass |
| 64 | <60 | Slight Rub-Off | Fail |

A dramatic improvement in cure over the Peroxide in Ink/Amine in Coating construct 4-2A is obtained when adding the peroxide to the coating and amine to the ink.

It was necessary to put the reactive materials in separate layers because amines and organic peroxides are not compatible for storage in intimate contact. An uncontrolled chain reaction can occur that results in the disassociation of the peroxide with generation of free radicals with possibly dangerous consequences as has been well documented in the industrial literature. EC ink containing amine is a long-standing practice and is well documented as possessing commercially acceptable shelf stability. The presence of peroxide in a water-based coating is not anticipated to cause storage issues either and will be addressed in a later example.

In these tests, placing peroxide in the non-reactive coating and amine in the ink was found to be far superior to the reverse, and results in commercially acceptable UV curing performance and processing speeds. In this case, an amine in an EC ink layer has completely replaced the traditional organic photoinitiators used in earlier examples.

Example 5: Effectiveness of Individual Components on the Curing of Wet Trapped Peroxide/Amine EC Curing Compositions A series of experiments were undertaken to determine the effects of the following components on curing of wet trapped peroxide/amine EC curing compositions.
1. Peroxide cure package identity and concentrations
   a. Luperox A-98 (benzoyl peroxide, room temperature solid) was varied from 0.0% to 6.4%.
      i. Glycerol used as diluent/co-solvent for the A-98 and was varied from 0.0% to 4.7%
      ii. Propylene carbonate used as a diluent/co-solvent for the A-98 and was varied from 0.0% to 3.7%
   b. Luperox P (t-Butyl Perbenzoate)—a preferred material due to being a liquid at room temperature allowing for easy stir-in incorporation, was varied from 0.0% to 6.4%.
2. Amine identity and concentrations
   a. EHA (2-Ethylhexyl-4-dimethylaminobenzoate) was varied from 0.0% to 3.4%
   b. A-101 (diethyl amine adduct with TPGDA) was varied from 0.0% to 6.4%
   c. TPGDA, chosen as the "make-up" material to bring the ink formulas to 100% since it is already present as part of the A-101 construction, was added in amounts from 0.0% to 9.5%.
   d. Yellow color base was ink FLCWB2445033 from Sun Chemical.
3. Deionized water, makeup material for the 841349 RYCOLINE water-based coating, was added to bring the formula to 100%, additions varying from 0.0% to 6.4%.
4. UV Power—all tests were run at 50 m/min with medium pressure Hg vapor lamp
   a. 100% Power (160 W/cm)
   b. 75% Power (120 W/cm)
   c. 50% Power (80 W/cm)

Twenty (20) coating formulas and 20 ink formulas were prepared within the boundaries of the experimental design. The same level of the base ink and the base coating was used in each formula (nominally 91% of each formula), so that the concentrations of the basic starting materials do not enter into any determination of which variables have the greatest effects on performance.

Inks were rolled out on BYK Chart 2810 coated paper using a Quick Peek roller to 1.15+/−0.15 nominal density. Coatings were applied over the wet inks using a 2-roll handproofer with 165 lpi×14 bcm anilox roller. The coating was allowed to air dry at room temperature for 100 seconds. Three samples of each formula combination were made. The samples were fed into the medium pressure mercury vapor UV curing unit at 50 mpm (164 fpm) and each sample was exposed to a different amount of UV power, those levels being 100%, 75% and 50% of full power, (100% power=160 W/cm of bulb length). Thumb Twist resistance tests were performed at various time intervals post-exposure to UV.

A numerical scale was used to quantify thumb twist resistance. If the sample cured immediately, the score was recorded as a "5". If it cured sufficient to resist the thumb twist test within 15 minutes, the score was a "4", if the sample did not resist thumb twist at all at 60 seconds post UV exposure, it rated a "0," as shown below.

| Time after UV Exposure Needed to Pass Thumb Twist Resistance Test | Rating |
|---|---|
| Immediately post-exposure | 5 |
| 15 minutes post-exposure | 4 |
| 30 minutes post-exposure | 3 |
| 45 minutes post-exposure | 2 |
| 60 minutes post-exposure | 1 |
| Fails test after 60 minutes | 0 |

It was found that benzoyl peroxide is a preferred initiator vs. t-butyl perbenzoate, though both are viable. Peroxide effects are enhanced when coupled with amines in the ink. It was found that EHA is a more effective cure synergist vs. PHOTOCRYL A-101, though both are viable. UV power was directly correlated with degree of curing showing that the cross-linking is a photoinitiation and not some unrelated chemical reaction.

Six ink/coating combinations scored a "5" at each level of UV exposure; 50%, 75% and 100% of full power. Those combinations are shown in Tables 13 through 15.

TABLE 13

Components of Best Performing Peroxide Containing Water-based Coatings

| Coating ID | Peroxide | | | Diluent | | Base Ctg |
|---|---|---|---|---|---|---|
| | Benzoyl peroxide | t-Butyl perben-zoate | Glycerol | Propylene Carbonate | DI Water | Ry. 841349 |
| C-1 | | 4.2% | | 1.5% | 4.5% | 89.9% |
| C2 | 6.2% | | | | 3.0% | 90.8% |
| C3 | | 3.0% | | | 6.0% | 91.0% |
| C4 | | 3.0% | 4.7% | | 3.0% | 89.4% |
| C5 | | 6.4% | | | 3.7% | 89.9% |
| C6 | 4.7% | | 1.7% | | 3.0% | 90.5% |

TABLE 14

Components of Best Performing Amine Containing Inks

| Ink ID | Yellow Ink Base | Amine | | Acrylate |
|---|---|---|---|---|
| | | EHA | A-101 | TPGDA |
| I-1 | 90.6% | 1.7% | 3.2% | 4.5% |
| I-2 | 90.6% | 3.0% | 6.4% | |
| I-3 | 90.0% | 3.4% | | 6.6% |
| I-4 | 91.0% | 2.8% | 6.3% | |
| I-5 | 91.0% | 2.7% | | 6.2% |
| I-6 | 91.2% | 1.5% | 3.0% | 4.3% |

TABLE 15

The 6 Best Performing Ink/Coating Combinations

| R4232 Proof Numbers | INK | | Coating | | |
|---|---|---|---|---|---|
| | EHA | A-101 | Benzoyl peroxide | t-Butyl perbenzoate | DI Water |
| I-3/C-3 | 3.41% | | | 3.00% | 6.00% |
| I-2/C2 | 3.00% | 6.40% | 6.20% | | 3.00% |
| I-4/C4 | 2.75% | 6.25% | | 3.00% | 3.00% |
| I-5/C5 | 2.74% | | | 6.40% | 3.70% |
| I-1/C1 | 1.70% | 3.20% | | 4.20% | 4.50% |
| I-6/C6 | 1.50% | 3.00% | 4.70% | | 3.00% |

Each of the combinations in Table 15 cured immediately upon exposure to light at 50 m/min using UV medium pressure Mercury vapor lamp at 50% power (80 W/cm).

It can be seen that in these systems, each of the Best 6 formulas contain EHA in the ink, and peroxide and added water in the coating. Higher peroxide levels are correlated with better curing.

Additionally, coating C2, paired with ink I2 provided one of the better performing samples, scoring a "5" for thumb twist resistance. Coating C2 contains 6.2% benzoyl peroxide and 3.0% makeup water.

A comparison coating, similar to coating C2, contains 5.9% Luperox A98 and 3.2% makeup water, the balance being RYCOLINE 841349. The comparison coating was applied over a comparison ink containing FLCWB2445 but no EHA or A-101.

The combination of comparison coating/ink achieved a thumb twist rating of "0" at 50%, 75% and 100% UV power, while the coating/ink combination of C2/I2 achieved a thumb twist rating of "5" at 50%, 75% and 100% UV power.

The only substantive difference between these two constructs is the presence of amines in the ink I2 while no amine is present in the comparison ink. This illustrates the critical nature of the peroxide/amine interaction in achieving excellent UV curing properties at roughly equal benzoyl peroxide levels.

Example 6: Effect of Storage on Peroxide Performance

A shelf-stable combination of peroxide containing coating and amine containing ink is shown. There are strong commercial disadvantages in providing an ink system that needed to mix two or more reactive components prior to printing for inks that are printed in the uncured state. Foremost is the inconvenience of needing to weigh and mix items together prior to use as opposed to just taking the ink out of the package and putting it on the press. Secondly is the problem of poor stability on press, where such materials often cure in the ink delivery systems of the press or cause other problems.

Specifically with regards to peroxides and (meth)acrylates, such combinations are either not stable at all, or stable for only a matter of hours or days. Being able to store unused material for later use is not an option. Peroxide that has been combined with reactive material, such as is often present in an ink or coating, starts to thicken in a matter of hours and typically develops lumps within several days rendering the mixed materials unusable.

Amines in combinations with (meth)acrylates, on the other hand, have been used in free-radical cured UV inks for decades. Those skilled in the art are well aware of inks/ coatings containing amines that make commercial claims of being stable for >6 months are, in reality, usually stable for much longer periods of time.

Experiments were done using peroxides that are liquid at room temperature, incorporating them into RYCOLINE 841349 water-based acrylic coating. This coating does not contain unsaturated materials. The organic peroxides Luperox P (tert-butyl perbenzoate, CAS #614-45-9) and Luperox DI (di-tert-butyl peroxide, CAS #110-05-4) were mixed at various concentrations into RYCOLINE 841349 with good agitation and stored in the dark in glass vials with PE-lined polymer caps, to produce coatings 1 to 7. Periodically the samples were brought out and inspected.

TABLE 16

Formulas of coatings 1 to 10

| Coating ID | Water-Based Coating (%) (RYCOLINE 181349) | Peroxide (%) (LUPEROX P) | Peroxide (%) (LUPEROX DI) |
|---|---|---|---|
| 1 | 97.6% | 2.4% | — |
| 2 | 95.8% | 4.2% | — |
| 3 | 94.0% | 6.0% | — |
| 4 | 91.8% | 8.2% | — |
| 5 | 90.0% | 10.0% | — |
| 6 | 98.0% | — | 2.0% |
| 7 | 95.8% | — | 4.2% |
| 8 | 94.0% | — | 6.0% |
| 9 | 92.0% | — | 8.0% |
| 10 | 90.0% | — | 10.0% |

TABLE 17

Fluidity of samples with age containing LUPEROX P in RYCOLINE 181349 coating

| Age (days) | Coating 1 | Coating 2 | Coating 3 | Coating 4 | Coating 5 |
|---|---|---|---|---|---|
| 0.8 | thin fluid | thin fluid | thin fluid | thin fluid | slightly thicker |
| 1.9 | thin fluid | thin fluid | thin fluid | slightly thicker | thick fluid |
| 4 | thin fluid | thin fluid | thin fluid | slightly thicker | thick fluid |
| 14 | thin fluid | thin fluid | thin fluid | slightly thicker | gel |
| 21 | thin fluid | thin fluid | thin fluid | slightly thicker | gel |
| 42 | thin fluid | thin fluid | thin fluid | slightly thicker | semi-solid |
| 63 | thin fluid | thin fluid | slightly thicker | thick fluid | solid |
| 91 | thin fluid | thin fluid | slightly thicker | thick fluid | solid |
| 152 | thin fluid | thin fluid | slightly thicker | thick fluid | solid |
| 198 | thin fluid | thin fluid | slightly thicker | thick fluid | solid |

Coating samples containing ≥6.0% LUPEROX P began to thicken after approximately one month. Even though the sample containing 8.2% LUPEROX P (coating 4) thickened substantially over time, at the end of the aging study it was still capable of being coated using a standard 2-roll flexo Handproofer producing a smooth, defect-free coating.

To determine the efficacy of the fully aged coating samples, a sample of photoinitiator-free yellow energy curable ink containing amine was made consisting of 95.8% yellow FLCWB2445033 from Sun Chemical and 4.2% EHA (2 ethylhexyl-4-dimethylaminobenzoate) from IGM Resins. It was printed on uncoated paper BYK Chart 2831 using a QUICK-PEEK roller, then overcoated with one of the above coatings that had been aged for 198 days, using a 2-roll Handproofer with 360 lpi×4.23 bcm anilox. The proofs were air-dried at room temp for 1-2 minutes before being exposed to UV light from a medium pressure mercury vapor lamp at a conveyor speed of 40 m/min and 100% power (160 W/cm). Radiometer readings (EIT unit) indicated a UV dosage of:

$UV_A$=104 mJ/cm$^2$
$UV_B$=111 mJ/cm$^2$
$UV_C$=13 mJ/cm$^2$
Total UV=228 mJ/cm$^2$ A control was also produced where RYCOLINE 841349 coating, with no added peroxide) was applied over the ink, dried and exposed to UV in the identical manner as described above. All samples except for the control showed good initial thumb twist and finger rub resistance. The results of the solvent rub tests with isopropanol on a cotton tipped wooden swab are shown in Table 18.

TABLE 18

Resistance to Isopropanol Solvent Rubs of coatings 1 to 5 after 198 days

| Coating | 1 hr. post-UV |
|---|---|
| 1 | 68 |
| 2 | 88 |
| 3 | 106 |
| 4 | 93 |
| 5 | Not tested |
| Control | 5 |

Table 18 shows that increasing levels of peroxide (up to 6%) produces increased cure. At levels above 6%, the cure begins to diminish slightly.

Similar tests were performed using LUPEROX DI as the initiating peroxide (coatings 6 to 10). Samples were stored in an opaque container at room temperature. All samples containing LUPEROX DI remained fluid and workable over the duration of the aging test, showing that the formulas are age-stable.

TABLE 19

Fluidity of coatings 6 to 10

| Age (days) | Coating 6 | Coating 7 | Coating 8 | Coating 9 | Coating 10 |
|---|---|---|---|---|---|
| 0.8 | thin fluid | thin fluid | thin fluid | thin fluid | thin fluid |
| 1.9 | thin fluid | thin fluid | thin fluid | thin fluid | thin fluid |
| 4 | thin fluid | thin fluid | thin fluid | thin fluid | thin fluid |
| 14 | thin fluid | thin fluid | thin fluid | thin fluid | thin fluid |
| 21 | thin fluid | thin fluid | thin fluid | thin fluid | thin fluid |
| 42 | thin fluid | thin fluid | thin fluid | thin fluid | thin fluid |
| 63 | thin fluid | thin fluid | thin fluid | slightly thicker | slightly thicker |
| 91 | thin fluid | thin fluid | thin fluid | slightly thicker | slightly thicker |
| 152 | thin fluid | thin fluid | thin fluid | slightly thicker | slightly thicker |
| 198 | thin fluid | thin fluid | thin fluid | slightly thicker | slightly thicker |

Tests identical to those previously mentioned, i.e., printing the coating over an amine containing ink, were performed to test the curing ability of these coatings at the conclusion of the aging test. As in the previous case, thumb twist and finger rub resistance were immediately present. Solvent resistance results with isopropanol on a cotton tipped wooden swab are shown below:

TABLE 20

Resistance to isopropanol solvent rubs
of coatings 6 to 10 after 198 days

| Coating | 1 hr. post-UV |
| --- | --- |
| 6 | 20 |
| 7 | 26 |
| 8 | 18 |
| 9 | 22 |
| 10 | 12 |

Both Luperox P and DI were shown to be capable of producing a blend of organic peroxide and water-based acrylic coatings stable for at least 6 months. Both were also shown to be capable of retaining the ability to strongly initiate UV curing in an EC ink containing amine after 6 months aging. The Luperox P is less stable than Luperox DI, but also more strongly initiates cross-linking.

Example 7: UV Curing of Ink/Coating System on Polymer Film

This Example demonstrates the use of the present method on a polyester film. Different substrates may cause different curing behavior of the inks. In this Example, a very small amount of photoinitiator is included in the ink formulation.

EC Ink Formulation

The following components were mixed to prepare the amine containing ink containing 0.4% photoinitiator:

TABLE E

| Ink Formulations | |
| --- | --- |
| Rahn GENORAD AB-2 (Amine)<br>product of 4-dimethylamino-benzoic acid and ethoxylated trimethylol propane | 5.1% |
| Miwon PHOTOCRYL A-101 (Amino acrylate)<br>product of tripropyleneglycol diacrylate, (TPGDA) with diethyl amine | 5.1% |
| IGM OMNIPOL TX, thioxanthone photoinitiator<br>di-ester of carboxymethoxy thioxanthone and polytetramethyleneglycol 250 | 0.4% |
| Yellow EC Flexo ink- photoinitiator-free | 89.4% |

Non-EC Coating Formulation

The following components were mixed to prepare a water-based coating composition containing organic peroxides:

TABLE F

| Ink Formulations | |
| --- | --- |
| RYCOLINE WB Coating 841349 | 91.9% |
| LUPEROX P,<br>tert-butyl perbenzoate | 4.1% |
| LUPEROX DI,<br>di-tert-butyl peroxide | 4.0% |

The yellow ink above was proofed onto a PET film using a bladed hand proofer, 800 lpi×1.7 bcm and coated while wet with the water based coating above using a bladed hand proofer, 360 lpi×4.23 bcm. The proof was then exposed to medium pressure mercury vapor UV light (see App. VI for conditions) with total UV dosage of 128 mJ/cm².

After the initial UV dose, the ink construct had successfully cured and displayed a resistance to 40 isopropanol rubs before breakthrough. No significant change in rub resistance was observed after exposure to one and two additional UV doses.

Example 8. Cure Using Different Colored Inks

Further tests were conducted using a commercial set of Cyan, Magenta, Yellow and Black energy curable inks from which the photoinitiator is removed. In this Example, the inks were applied to Leneta N2A-3 uncoated paper, as opposed to the coated paper of earlier Examples.

Cure of the energy curable inks was tested under the following conditions:

| Condition | Heat | UV Dose |
| --- | --- | --- |
| 1 | None | Yes |
| 2 | Yes | None |
| 3 | Yes | Yes |

UV exposure was supplied with a medium pressure mercury vapor lamp at approximately 123 mJ/cm² total energy. Settings were: belt speed at 115 fpm (35 mpm), at a UV output power of 26%. The UV dosage was recorded as:

$UV_A$=48 mJ/cm²

$UV_B$=64 mJ/cm²

$UV_C$=11 mJ/cm²

Total UV=123 mJ/cm²

Heat coming from the UV lamp was present in all UV exposures and was not accounted for separately. The incoming temperature of the proof at 24° C. rose to 43.3° C. at the exit of the UV curing unit. This was not considered sufficient to warrant further consideration. The amount of added heat that was tracked, or specifically accounted for, in the tests involving the Cyan, Yellow and Black inks was supplied for 60 seconds in an oven at 98° C.; oven temperatures for Magenta inks was 90° C. The conditions for all other steps, making the proofs, subsequent aging, etc., took place at room temperature of 23° C.

The substrate in these tests was Leneta N2A-3 uncoated paper. Inks and coatings were applied using Harper Phantom bladed hand proofer, 3.60 lpi×4.23 bcm anilox. The inks were proofed onto the paper with a coating weight of approximately 1.90 g/m². The Water-based coating was proofed over the ink while the ink was still wet. Coating weight was 1.00 g/m².

For the following tests, a water-based, non-EC coating 8C was prepared containing:

TABLE G

| RYCOLINE 841349 | 91.95% |
| --- | --- |
| tert-butyl perbenzoate | 4.55% |
| di-tert-butyl peroxide | 3.50% |
| | 100.00% |

Total peroxide = 8.05%

Photoinitator-free Cyan, Yellow, Magenta and Black inks for study were prepared according to the formula in the following table. A combination of amines was used, GENOPOL AB-2, the reaction product of 4-dimethylamino-benzoic acid and ethoxylated trimethylol propane, and PHOTOCRYL A-101, reaction product of tripropyleneglycol diacrylate, (TPGDA) with diethyl amine.

TABLE 21

Formulations of Cyan, Yellow, Black and Magenta Inks

|  | Cyan Ink | Yellow Ink | Black Ink | Magenta Ink |
|---|---|---|---|---|
| Cyan | 90.4% | — | — | — |
| Yellow | — | 90.4% | — | — |
| Black | — | — | 89.8% | — |
| Magenta | — | — | — | 89.6% |
| GENOPOL AB-2 (Rahn) | 4.8% | 4.8% | 5.1% | 5.2% |
| PHOTOCRYL A-101 (Miwon) | 4.8% | 4.8% | 5.1% | 5.2% |

UV exposure occurred while the coating was still semi-wet. If UV exposure and heating in the oven were both used in a curing protocol, the heating in the oven was done following the UV exposure. Thumb twist resistance and finger rub resistance tests were performed approximately 10 minutes after the ink had been placed on the paper.

Isopropanol double rubs (one rub is a back-and-forth motion across the proof) were performed, 3 tests per sample. Initial rubs occurred 10-15 minutes after the ink was proofed on to the paper. Additional rub tests, for Cyan, Yellow and Black inks, occurred as indicated, approximately 3 days after samples were made. Additional rub tests for Magenta inks occurred approximately 2 days after samples were made.

TABLE 22

Isopropanl 2X Rubs for Inks cured under different conditions

|  | UV | | Heat | | UV + heat | |
|---|---|---|---|---|---|---|
|  | initial | 3 days | initial | 3days | initial | 3 days |
| Cyan | 13 | 18 | 15 | 17 | 23 | 19 |
| Yellow | 28 | 48 | 12 | 26 | 28 | 26 |
| Black | 14 | 18 | 13 | 17 | 9 | 15 |
|  |  | 2 days |  | 2 Days |  | 2 Days |
| Magenta* |  | 34 |  | 11 |  | 35 |

*Magenta was tested under slightly different conditions in order to also examine other possible curing mechanisms that are not part of this invention. The main differences being that the oven temperatures for Magenta inks was a little lower, 90° C. instead of 98° C. and the dwell time before the IPA rub test was 2 days instead of 3.

The above table shows that UV curing was achieved for Cyan, Magenta, Yellow and Black inks systems with EC ink containing amine and/or amino acrylate, and a topcoat containing organic peroxide in a non-reactive resin system, preferably a water-based acrylic resin; when the coating is wet-trapped over wet ink (/substrate/ink/coating/). All iterations of these experiments with different colored inks, with/without added heat, with/without added UV, were cured to the touch within 10 minutes of printing. This may be due at least in part to the ink penetration into the uncoated paper.

Color is highly relevant to the degree of ultimate cure achieved, as seen in the tables above. Added UV energy (medium pressure mercury vapor lamp) is relevant to the ultimate cure achieved, more UV=greater cure, added heat is not always effective, and the age of sample "post cure" can be relevant to the ultimate cure achieved.

Example 9: Comparison to Prior Art Wet Trapping Method

The following experiments directly compare the impact on reducing photoinitiator use between the present invention, wherein an ink containing little to no photoinitiator is wet trapped under an inert coating comprising peroxides, and the wet trapping method of US 2020/0369065, wherein the inert coating lacks the present peroxides. Three different substrates and four different colored inks were examined.

The three substrates were:
1. Uncoated paper; test form Leneta N2A-3 using the white (unprinted) portion.
2. Coated paper, test form BYK Chart 2810 using the white (unprinted) portion.
3. 92 ga. PET film (23 microns), commercially available.

Four colors of EC inks containing polymerizable acrylates with various additives were:
1. Cyan: EC resin+amines+1.2% photoinitiator; average coat weight; 0.99 g/m$^2$
2. Magenta: EC resin+amines+1.0% photoinitiator; average coat weight; 0.97 g/m$^2$
3. Yellow: EC resin+amines+0.5% photoinitiator; average coat weight; 0.86 g/m$^2$
4. Black; EC resin+amines+5.8% photoinitiator; average coat weight; 0.93 g/m$^2$ The Photoinitiator above is an approximately 1:1 by weight mixture of ethyl phenyl (2,4,6-trimethylbenzoyl) phosphinate, (TPO-L available from Sartomer EMEA or IGM Resins) and di-ester of carboxymethoxy thioxanthone and polytetramethyleneglycol 250, (OMNIPOL TX from IGM Resins).

In samples made according to US 2020/0369065 now U.S. Pat. No. 11,707,945, the ink was coated with RYCOLINE 841349 waterbase acrylic emulsion, available from Sun Chemical, wherein no peroxides were added. In samples made according to the present invention, the ink was coated with a composition comprising RYCOLINE 841349 waterbase acrylic emulsion system and organic peroxides according to the formula:

a) 79.9% Rycoline 841349
b) 4.0% Luperox P
c) 4.0% Luperox DI
d) 12.1% Deionized Water.

The samples were exposed to a Medium Pressure Mercury Vapor Lamp at a Power Level of 25%, using a Conveyor Speed of 35 meters/minute. The UV exposure, measured with an EIT PowerPuck™ Dosimeter was as follows:

|  | Dosage | Intensity |
|---|---|---|
| 1. $UV_A$ | 48 mJ/cm$^2$ | 1014 mW/cm$^2$ |
| 2. $UV_B$ | 54 mJ/cm$^2$ | 1253 mW/cm$^2$ |
| 3. $UV_C$ | 13 mJ/cm$^2$ | 286 mW/cm$^2$ |
| 4. $UV_V$ | 36 mJ/cm$^2$ | 716 mW/cm$^2$ |

Total UV energy $UV_A + UV_B + UV_C$ = 115 mJ/cm$^2$

Each ink was printed using a Harper bladed hand-proofer with anilox of 800 lpi×1.70 bcm. Paper masks were used to define and control the shape and size of the patches of ink printed on the substrate. The coating, either with or without added peroxides, was then printed over the wet ink using a Harper bladed hand-proofer with anilox of 360 lpi×4.23 bcm. A patch of the coating slightly larger than the ink patch was printed using a different paper mask with an average dry coating weight of 1.00 g/m$^2$.

Within approximately 20 minutes after UV exposure each sample was evaluated for resistance to Marring, i.e., Thumb Twist test, and Resistance to Solvent, i.e., Isopropanol 2× Rubs until it was visually determined that a majority of the ink (>50%) had been removed from the substrate.

TABLE 23

Results, EC Cyan with 1.2% PI

| Substrate ID | Substrate Type | Peroxide in top coating | Thumb twist test | *Isopropanol (2x) Rubs |
|---|---|---|---|---|
| Leneta N2A-3 | Uncoated Paper | 0.0% | PASS | 6.4 |
| Leneta N2A-3 | Uncoated Paper | 8.0% | PASS | 15.8 |
| BYK Chart 2810 | Coated Paper | 0.0% | Fail | 1.6 |
| BYK Chart 2810 | Coated Paper | 8.0% | PASS | 23.2 |
| 0.23 μm PET | bi-ax oriented film | 0.0% | Fail | 1.9 |
| 0.23 μm PET | bi-ax oriented film | 8.0% | PASS | 9.0 |

*Average of three replicates

TABLE 24

Results, EC Magenta with 1.0% PI

| Substrate ID | Substrate Type | Peroxide in top coating | Thumb twist test | *Isopropanol (2x) Rubs |
|---|---|---|---|---|
| Leneta N2A-3 | Uncoated Paper | 0.0% | PASS | 14.5 |
| Leneta N2A-3 | Uncoated Paper | 8.0% | PASS | 20.6 |
| BYK Chart 2810 | Coated Paper | 0.0% | Fail | 4.1 |
| BYK Chart 2810 | Coated Paper | 8.0% | PASS | 30.2 |
| 0.23 μm PET | bi-ax oriented film | 0.0% | Fail | 2.4 |
| 0.23 μm PET | bi-ax oriented film | 8.0% | PASS | 9.0 |

*Average of three replicates

TABLE 25

Results: EC Yellow with 0.5% PI

| Substrate ID | Substrate Type | Peroxide in top coating | Thumb twist test | *Isopropanol (2x) Rubs |
|---|---|---|---|---|
| Leneta N2A-3 | Uncoated Paper | 0.0% | PASS | 10.8 |
| Leneta N2A-3 | Uncoated Paper | 8.0% | PASS | 20.6 |
| BYK Chart 2810 | Coated Paper | 0.0% | Fail | 2.2 |
| BYK Chart 2810 | Coated Paper | 8.0% | PASS | 73.8 |
| 0.23 μm PET | bi-ax oriented film | 0.0% | Fail | 1.2 |
| 0.23 μm PET | bi-ax oriented film | 8.0% | PASS | 14.2 |

*Average of three replicates

TABLE 26

Results: EC Black with 5.8% PI

| Substrate ID | Substrate Type | Peroxide in top coating | Thumb twist test | *Isopropanol (2x) Rubs |
|---|---|---|---|---|
| Leneta N2A-3 | Uncoated Paper | 0.0% | PASS | 8.9 |
| Leneta N2A-3 | Uncoated Paper | 8.0% | PASS | 15.2 |
| BYK Chart 2810 | Coated Paper | 0.0% | Fail | 2.4 |
| BYK Chart 2810 | Coated Paper | 8.0% | PASS | 12.9 |
| 0.23 μm PET | bi-ax oriented film | 0.0% | PASS | 10.1 |
| 0.23 μm PET | bi-ax oriented film | 8.0% | PASS | 15.2 |

*Average of three replicates

It is seen the present methods provides excellent curing over the uncoated paper, coated paper, and polyester substrates tested, whereas the peroxide-free method of US 2020/0369065 now U.S. Pat. No. 11,707,945 failed to provide adequate curing on the coated paper, and polyester substrates employed.

The above data shows a rough correlation between an acceptable level of Isopropanol 2× Rub resistance (which is a quantitative test) and the widely accepted thumb-twist resistance test (which is a qualitative test). IPA rubs of 6.4 in Table I was a "pass" for thumb-twist, and 4.1 in Table II was a "fail." A value of "6 or greater" for the isopropanol rub test is therefore correlated with a "pass" for the thumb-twist test in these experiments. Thus, the present method overcomes the cure inhibition seen in substrates such as BYK Chart 2810 coated paper, while simultaneously enabling cure with significantly less photoinitiator.

Example 10: Examination of Substrate Effect on Post-Cure

The degree to which the overall cure is dependent on so-called "post-curing" reactions, which take place after free radical polymerization has started, and the impact of the substrate on post curing is evaluated.

A duplicate set of the EC Yellow ink plus 0.5% PI samples trapped under the peroxide containing top coating of Example 9 were prepared. The inks shown in Table III were tested around 10-20 minutes after being made. The duplicate set was exposed to UV light as above and evaluated, Thumb-Twist Test and Isopropanol 2× Rub test, 24 hours after exposure. Table 27 below compares the test results obtained about 15 minutes after UV exposure to the results obtained after 24 hours.

TABLE 27

Results: EC Yellow with 0.5% PI Under Top Coat containing 8.0% Peroxides

| Substrate ID | Substrate Type | Peroxide in top coating | Post UV Exposure Time (hrs) | Thumb twist test | *Isopropanol (2x) Rubs |
|---|---|---|---|---|---|
| Leneta N2A-3 | Uncoated Paper | 8.0% | 0.25 | PASS | 20.6 |
| Leneta N2A-3 | Uncoated Paper | 8.0% | 24.00 | PASS | 18.5 |
| BYK Chart 2810 | Coated Paper | 8.0% | 0.25 | PASS | 73.8 |
| BYK Chart 2810 | Coated Paper | 8.0% | 24.00 | PASS | 126.2 |
| 0.23 μm PET | bi-ax oriented film | 8.0% | 0.25 | PASS | 14.2 |
| 0.23 μm PET | bi-ax oriented film | 8.0% | 24.00 | PASS | 23.8 |

*Average of three replicates

There is no statistical basis for concluding that the initial and 24 hr results over Leneta N2A-3 of 23 micron PET film are different. However, the initial and 24 hour results over BYK Chart 2810 are clearly different and the Isopropanol 2× Rub test values at 24 hrs have risen. It therefore appears that the importance of prolonged post-cure can depend on the substrate printed upon.

Summary

It has been shown that traditional photoinitiators can be greatly reduced or eliminated from Energy Curable ink systems by the present method, wherein a non-reactive coating comprising an organic peroxide is layered over an EC-ink containing an amine or amino acrylate before exposure to actinic radiation. As in many applications, minor differences in curing performance can be observed when using different substrates, different colored inks, etc., but still, successful curing is readily obtained.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A method for preparing a multi-layer cured print construct, the method comprising:
   a) providing a substrate;
   b) providing one or more energy-curable compositions (A), comprising:
      i) one or more energy curable monomers, oligomers and/or polymers comprising reactive functional groups capable of polymerizing or crosslinking under actinic radiation; and
      ii) wherein at least one of the one or more energy-curable compositions comprise an amine;
   c) providing one or more non-energy-curable composition (B), comprising:
      i) resins that do not comprise reactive functional groups capable of polymerizing or crosslinking under actinic radiation, and
      ii) one or more organic peroxides;
   d) applying the one or more compositions (A) onto the substrate as energy-curable ink layers;
   e) before curing the one or more energy curable layers, wet-trapping said one or more energy curable layers by applying the non-energy-curable composition (B) as a coating layer on top of the one or more ink layers of compositions (A);
   f) curing all of the ink layers of composition (A) simultaneously by a single exposure to an external electromagnetic radiation energy source producing an actinic effect to create a cured print construct;
   wherein the non-energy-curable composition (B) is dried or cured before, during or after exposure to actinic radiation;
   wherein all of the added amine is present in one or more of the one or more energy-curable compositions (A), and all of the added organic peroxide is present in one or more of the one more non-energy-curable compositions (B).

2. The method according to claim 1, wherein the one or more non-energy-curable composition (B) is a water-based composition.

3. The method according to claim 1 further comprising a step between steps e) and f) for drying the coating layer formed from the non-energy-curable composition.

4. The method of claim 1, wherein the amine of the energy curable composition(s) (A) is present in an amount of from 1-6 wt %, based on the total weight of the composition, and comprises an aromatic, alkyl, or alkanol amine, wherein the aromatic, alkyl, or alkanol amine does not bear a substituent that is reactive with ethylenically unsaturated energy-curable monomers, oligomers and/or polymers.

5. The method of claim 1, wherein the amine of the energy curable composition(s) (A) comprises an acrylated amine and is present in an amount from 5-25 wt % based on the total weight of the composition.

6. The method of claim 1 wherein one or more of the energy curable compositions (A) comprises a dye and/or pigment.

7. The method of claim 1 wherein at least one of the one or more energy-curable compositions (A) comprises one or more energy curable (meth)acrylate monomers.

8. The method of claim 1, wherein at least one of the one or more of the energy curable compositions (A) comprise photoinitiators in an amount of ≤5.5 wt % based on the total weight of the composition.

9. The method of claim 1, wherein none of the energy-curable compositions (A) and none of the non-energy-curable compositions (B) comprise a photoinitiator.

10. The method of claim 1, wherein the peroxide in the non-energy-curable composition (B) is present in an amount of about 3-8% wt %, based on the total weight of the composition.

11. The method of claim 1, wherein the ink and coating layers are successfully cured within 2 hours of exposure to UV energy.

12. The method claim 1, wherein the substrate is first printed with one or more layers of an ink or coating which are all fully dried or cured prior to commencing step (b).

13. The method according to claim 1, wherein the energy curable composition (A) ink layer(s) are applied by digital, flexo, gravure, offset or screen-printing processes or a combination thereof and/or the water-based coating is applied by flexo, rod, gravure, spray, offset or roller processes.

14. The method of claim 1, wherein the substrate is porous.

15. The method of claim 14, wherein the porous substrate is selected from the group consisting of paper, non-woven paperboard or woven paperboard.

16. The method of claim 1 wherein the substrate is non-porous.

17. The method of claim 16, wherein the non-porous substrate is comprises a polymer film or a metal foil in the form of a flat sheet or web.

18. The method of claim 1, wherein the energy curable layers are cured by exposure to a UV lamp, UV laser, UV LED, sunlight, electron beam or combinations thereof.

19. The method of claim 17, wherein cure is provided by electron beam radiation exposure at a dose of from 5 kGy to 40 kGy.

* * * * *